United States Patent [19]

Finkensiep et al.

[11] 4,094,946

[45] June 13, 1978

[54] STRIPED SOAP, ITS PRODUCTION AND APPARATUS FOR ITS PRODUCTION

[75] Inventors: Friedhelm Finkensiep; Reinhold Walter Meye, both of Krefeld; Günter Thor, Krefeld-Traar, all of Germany

[73] Assignee: Henkel Kommanditgesellschaft auf Aktien, Dusseldorf-Holthausen, Germany

[21] Appl. No.: 695,455

[22] Filed: Jun. 14, 1976

[30] Foreign Application Priority Data

Jun. 16, 1975 Germany .............................. 2526917

[51] Int. Cl.² .................................................. B29F 3/06

[52] U.S. Cl. ..................................... 264/171; 264/245; 425/131.1; 425/204; 425/208; 425/462

[58] Field of Search ...................... 264/171, 75, 176 R, 264/211, 245–247; 425/131.1, 462, 204, 208

[56] References Cited

U.S. PATENT DOCUMENTS

| | | | |
|---|---|---|---|
| 2,296,842 | 9/1942 | Garvey et al. | 264/245 |
| 3,314,108 | 4/1967 | Wienand et al. | 264/75 |
| 3,398,219 | 8/1968 | Kelly et al. | 264/102 |
| 3,779,676 | 12/1973 | Bernard | 425/131 |
| 3,823,215 | 7/1974 | D'Arcangeli | 264/211 |
| 3,866,890 | 2/1975 | Tadmor et al. | 264/211 |
| 3,884,605 | 5/1975 | Grelon | 264/75 |
| 3,923,438 | 12/1975 | Perla | 264/245 |
| 3,999,921 | 12/1976 | Thor et al. | 425/208 |

FOREIGN PATENT DOCUMENTS

| | | | |
|---|---|---|---|
| 198,501 | 7/1958 | Austria. | |
| 47-3,618 | 1/1972 | Japan | 252/371 |
| 47-3,619 | 1/1972 | Japan | 252/371 |

*Primary Examiner*—Jeffery R. Thurlow
*Attorney, Agent, or Firm*—Hammond & Littell

[57] ABSTRACT

A method for the production of two-color striped pieces of soap by continuously extruding two strands of colored soap, one strand encompassed by the other strand, passing said two strands of colored soap through a die orifice whereby a single strand of parallel strips is formed having a varied colored aspect in cross-section, cutting said strand and recovering two-color striped pieces of soap; as well as the apparatus and the soap pieces so produced.

3 Claims, 4 Drawing Figures

STRIPED SOAP, ITS PRODUCTION AND APPARATUS FOR ITS PRODUCTION

RELATED ART

A method for the production of striped soap pieces is known from the German published application DOS No. 2,254,119, where a soap composition is pressed through a system of parallel tubes with formation of strands. Simultaneously, a second, differently colored soap composition is pressed through a zone surrounding the tube arrangement, and thereafter through a plate provided with orifices. Thereafter the two soap strand systems thus formed come together and are subsequently subjected to an inwardly directed compression to form one extrusion or strand. This is subsequently cut into soap pieces.

This method requires a relatively complicated construction of the outflow region of the double-barrel extruder. Also, only striped soap extrusions can be produced thereby, where the soap strands formed first by the tubes with circular cross-sections are shaped into random structures by the compression of the two-soap compositions at the outlet end of the press. The extrusion or strand produced by this method does not have a uniform cross-section along the length of the strand. Besides, expensive measures must be taken to ensure synchronism of the two parallel screw presses.

Another method for the production of striped soap pieces is described in DOS No. 2,426,492 where several extrusions or strands of another soap, each strand separated from the others, are embedded into the circumference of an axially moving soap extrusion. Here also the moving composite soap mass is subsequently compressed radially at the outlet end.

For this method, two separate extruders must be used. The speeds of the two presses must be matched exactly to make sure that the ratio of the transported soap masses remains constant within narrow limits. This is possible only at a corresponding cost of control engineering.

The colored second soap composition is further embedded in the differently colored soap extrusion from the outside by means of a distributor. Accordingly, it is possible only to arrange the embedded strips more or less peripherally to the cross-section of the main extrusion. A major difficulty in this method is to transport the second soap composition, in the form of longitudinal strips, uniformly over the circumference of the distributor. This, as is known, is possible only to a certain extent, with the result that the cross-sections of the extrusions embedded along the surface of the base extrusion may easily vary and especially in an uncontrollable manner. This in turn leads to an impairment of the aesthetic appearance of the cakes of soap formed from the extruded soap structure after its subdivision.

OBJECTS OF THE INVENTION

An object of the present invention is to improve the known methods so that the produced multicolor soap extrusions or strands have a substantially uniform cross-section along the extruded length and as a principal embodiment can show color strips arranged radially in ray-form, in particular, also extending up to the axis. Also, this objective is to be achieved while at the same time the apparatus used is simplified.

Another object of the present invention is the development of a process for the production of two-color striped pieces of soap comprising the steps of continuously extruding two strands of colored soap, the outer strand encompassing the inner strand and each strand having a different color, said extrusion being at an equal rate for each strand, passing said two strands of colored soap through separate die orifices within a radial cross-section whereby said two strands of colored soap are combined in a predetermined cross-section with said inner strand having a cross-section other than circular and compressed, cutting said compressed combined strand, and recovering two-colored striped pieces of soap.

A further object of the present invention is the obtaining of two-colored striped pieces of soap produced by the above process.

A yet further object of the present invention is the development, in an extruder provided with a hopper at one end and a restricted nozzle at the opposite end and two press screws arranged coaxially in one another within an outer jacket, each of said screws being provided with a male thread for feeding in the direction of said nozzle, said male threads extending into an outer annular space between said jacket and the outer press screw and extending into an inner annular space between said two press screws, said threads being oppositely oriented, means to rotate the outer of said two press screws and means to maintain the inner of said two press screws stationary, said outer press screw being provided with window-like openings communicating with said inner press screw in the area of said hopper and separate feed means in said hopper to separately feed to the area between said outer jacket and said outer press screw and to the area between said outer press screw and said inner press screw through said window-like openings, the improvement consisting in that said restricted nozzle is provided with two channels having a predetermined outlet cross-section with the outer channel at the inlet completely encompassing the inner channel, said outer channel at the inlet being fed from said outer press screw and said inner channel at the inlet being fed from said inner screw, the outlet cross-section of said inner channel being other than circular, whereby the outer edge of said inner channel cross-section at the outlet is coextensive with the other channel cross section.

These and other objects of the invention will become more apparent as the description thereof proceeds.

THE DRAWINGS

DESCRIPTION OF THE INVENTION

Figure 1:
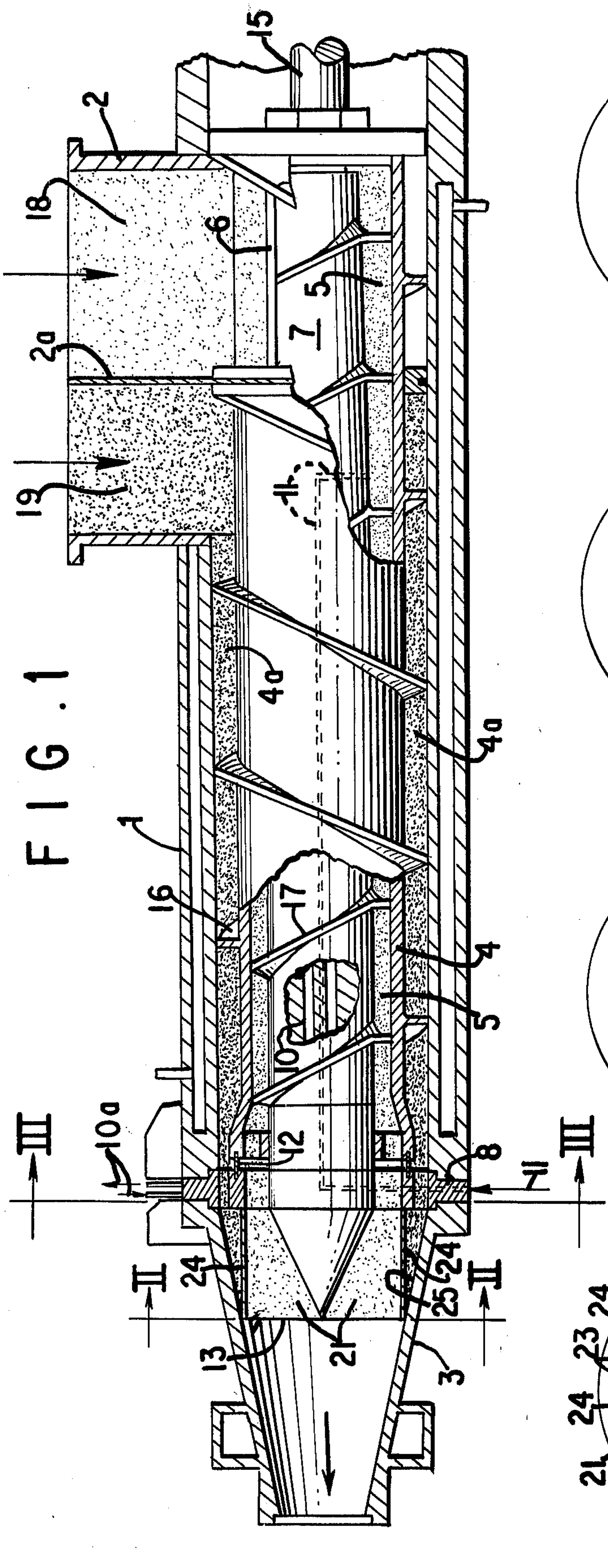
FIG. 1 is a longitudinal cross-section through the extruder, partially broken away.

The invention relates to a method for the production of multicolor striped pieces of soap from a continuously formed extrusion of striped soap with the use of a coaxial screw press.

It has been found, surprisingly, that the problems of the prior art can be solved and the above objects can be achieved by the use of a special coaxial screw press. The coaxial screw press must consist of two screws arranged counter-rotating one in the other. Each of the two screws must carry an outer worm groove. Further, the inner screw must be stationarily mounted. These screws are to contain channels for liquid additives or coolants.

It is essential finally that in the outflow cone, stationary guide channels in compartmentalized form are arranged, which extend into or to just before the exit cross-section of the cone. These guide channels are arranged so that, for example, in the case of a radially ray-shaped cross-section design of the extruded soap structure, every other vane section is supplied by the centrally fed soap mass, and the vane sections therebetween by the soap mass supplied by the second screw surrounding the centrally arranged screw.

The guide channels according to the invention extend over the entire cone length to just before the exit cross-section thereof.

It is obvious that the individual channels may be in connection only with that pressing screw by which the respective soap mass is supplied. These channels must be sealed from the differently colored soap mass. In this way it is achieved that a coming together of the two soap mass streams occurs only in or just before the exit cross-section of the cone, a fact which is of great importance for a sharp mutual delimitation of the individual soap stripes.

More particularly, the invention relates to a process for the production of the two-color striped pieces of soap comprising the steps of continuously extruding two strands of colored soap, the outer strand encompassing the inner strand and each strand having a different color, said extrusion being at an equal rate for each strand, passing said two strands of colored soap through separate die orifices within a radial cross-section whereby said two strands of colored soap are combined in a predetermined cross-section with said inner strand having a cross-section other than circular and compressed, cutting said compressed combined strand and recovering two-colored striped pieces of soap; as well as the two-colored striped pieces of soap produced by the process.

In addition, the invention also relates to an improvement in an extruder provided with a hopper at one end and a restricted nozzle at the opposite end and two press screws arranged coaxially in one another within an outer jacket, each of said screws being provided with a male thread for feeding in the direction of said nozzle, said male threads extending into an outer annular space between said jacket and the outer press screw and extending into an inner annular space between said two press screws, said threads being oppositely oriented, means to rotate the outer of said two press screws and means to maintain the inner of said two press screws stationary, said outer press screw being provided with window-like openings communicating with said inner press screw in the area of said hopper and separate feed means in said hopper to separately feed to the area between said outer jacket and said outer press screw and to the area between said outer press screw and said inner press screw through said window-like openings, the improvement consisting in that said restricted nozzle is provided with two channels having a predetermined outlet cross-section with the outer channel at the inlet completely encompassing the inner channel, said outer channel at the inlet being fed from said outer press screw and said inner channel at the inlet being fed from said inner screw, the outlet cross-section of said inner channel being other than circular, whereby the outer edge of said inner channel cross-section at the outlet is coextensive with the other channel cross section.

The basic description of the coaxial screw press is to be found in Austrian Pat. No. 198,501 and a derivation of the same, describing the method of injecting liquid dyes is given in copending, commonly-assigned U.S. patent application Ser. No. 569,537, filed Apr. 18, 1975, now U.S. Pat. No. 3,999,921.

Naturally it is also possible to obtain additional color effects on the soap pieces by injecting additional colors into the soap mass in the direction of flow before the compartmentalized type guide channels. Possibilities of variation in this respect are almost unlimited.

After the blanks have been sectioned and blocked or pressed, cakes of soap with a striking aesthetic effect are obtained. The soap piece cross-sections show all around a symmetrical, asymmetrical, centered or star-shaped figure of the stripes. Also, crrespondingly colored circular, triangular or rectangular areas or such things as letters can be placed centered in the cross-section of the soap cakes.

The construction of the guide channels in compartmentalized form required for the outflow cone to obtain the above effects is obvious and lies within the skill of the specialist. These are essentially channels of sheet metal adequately braced by ribs. Details for one of the units of the mixing elements with stationary guide channels in compartmentalized form will be described later.

By the counter-rotation of the worm grooves of the outer and inner screws, a problem-free delivery of the two differently colored mass streams through the extruder is ensured. The delivery of the outer screw occurs through its rotation by means of a corresponding drive. On the other hand, in the inner screw, which is stationary, the flow of material is brought about by the inner wall of the outer screw designed as a hollow cylinder.

Through bores in the inner screw cooling agent, for example, cooling water can be conducted, whereby heat caused by friction can be removed from the extruder.

In the inner screw, in addition, bores are provided through which liquid additives, namely, colorants or dyes as a rule, can be conducted into the mass transported by the inner screw. For this purpose, these bores communicate with the space between their worm grooves. It is desirable to let the bores for the additive liquids open into the transport space approximately in the central zone of the inner screw.

It is an essential advantage of the method of the invention that special measures for obtaining synchronism of the two extruders are unnecessary.

The extruder according to the invention is represented in the figures of the Drawing by way of example.

FIG. 1 shows a longitudinal cross-section through the extruder, partially broken away.

Figure 2:
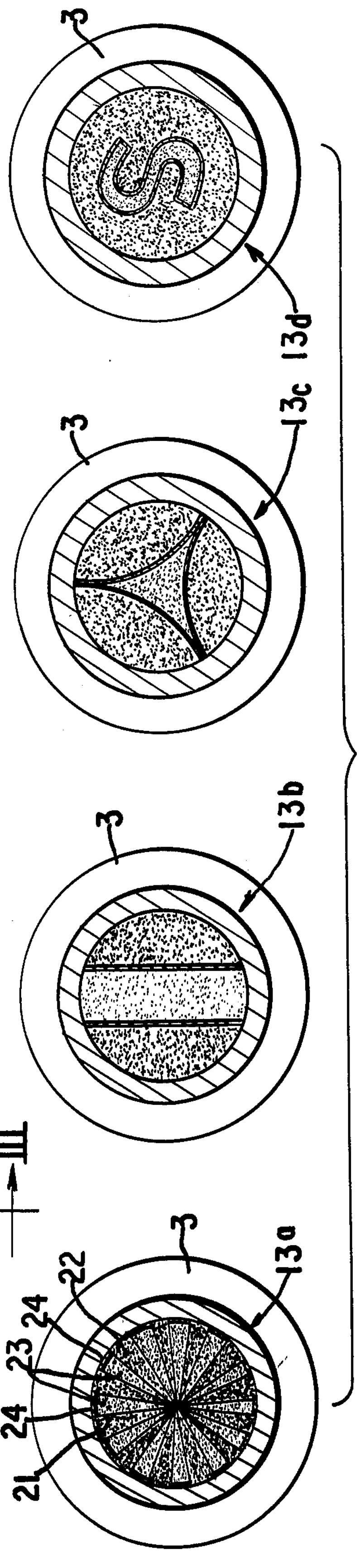
FIG. 2 is a view of several cross-sections along line II—II of FIG. 1.

FIG. 2 is a view of several cross-sections along line II—II of FIG. 1 showing examples of the mixing elements with the stationary guide channels in compartmentalized form in the outflow cone.

Figure 3:
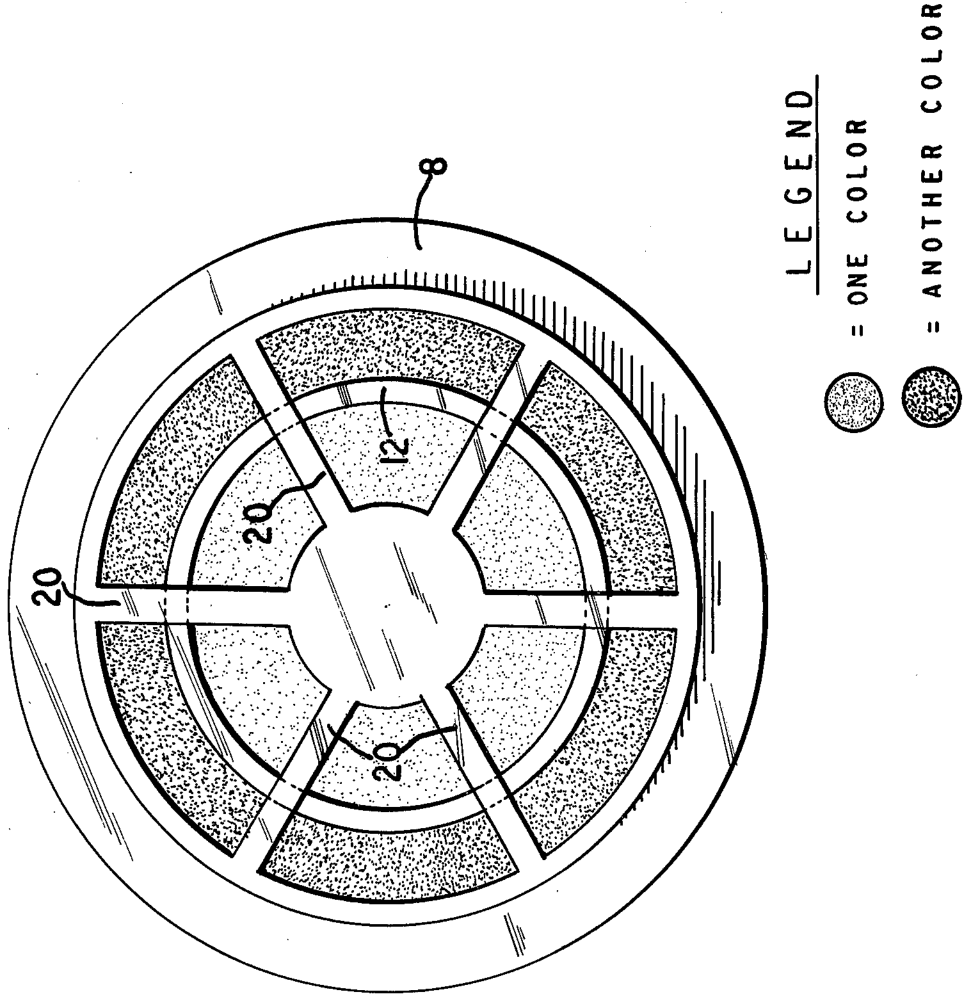
FIG. 3 is an enlarged cross-section along line III—III of FIG. 1.

FIG. 3 is an enlarged cross-section along line III—III of FIG. 1 showing the beginning of the compartmentalized channels.

Figure 4:
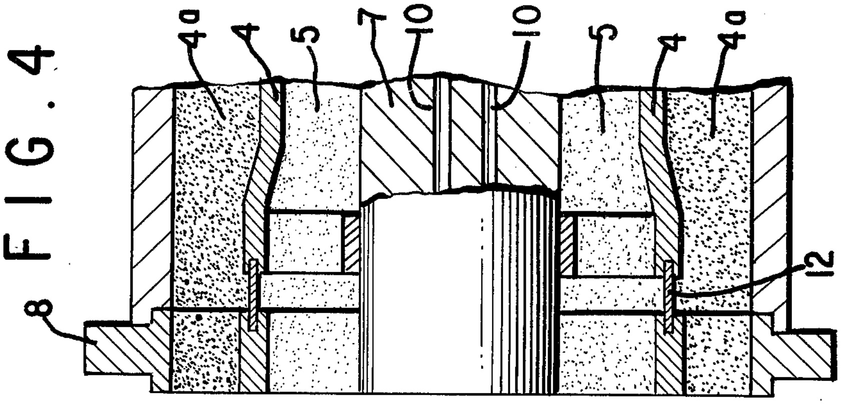
FIG. 4 is an enlarged longitudinal cross-section of the extruding end of the extruder.

FIG. 4 is an enlarged longitudinal cross-section of the outflow end of the extruder.

The extruder (FIG. 1) consists of two screws 4, 7 arranged coaxially one in one another in outer jacket 1 and each carrying a male screw thread for feeding different plastic materials to the outflow cone or nozzle 3. The outer screw 4 can be driven through drive shaft 15 by means of a drive (not shown). The inner screw 7 is stationary. Window type opening 6 in the outer screw 4 is provided in the area of the charging hopper 2, which establishes a connection of the inner screw 7 with the charging material.

The threads 16 of the outer screw 4 are oppositely oriented relative to the threads 17 of the inner screw 7. The inner screw 7 also may have bores or channels 10 for the circulation of a coolant. In addition, bore or bores 11 can also be provided in screw 7 for the introduction of liquid additives into the space between the threads 17 of the inner screw 7.

At the outflow cone end of the outer screw 4, the axial inner cylindrical space 5 is sealed from the conveyer space 4a by the ring 12 which extends to within the inlet of the stationary supporting grid 8.

In the outflow cone 3, the respective mixing elements 13*a* to 13*d* of stationary guide channels in compartmentalized form are fastened on the supporting grid 8 and extend into the outflow cone 3. Cross-sections of the mixing elements 13*a* to 13*d* along line II—II are shown in FIG. 2. FIG. 3 shows the cross-section of the exit from the stationary supporting grid 8 in enlarged form showing the ring 12 and the bracing bars 20. The outlet area of the conveyer space 4*a* is shown in one type of cross-hatching and the outlet area of the axial inner cylindrical space 5 is shown in a different type of cross-hatching.

With reference to mixing element 13*a* which has radial rays of different colors in cross-section, every other vane compartment 22 is fed from the conveyer space 4a and the alternate vane compartments 23 are fed from the axial inner cylindrical space 5. With the remaining mixing elements 13*b* to 13*d*, the inner section is fed from space 5 and the outer section from space 4*a*. In FIG. 1, the two outer sections 21 of a vane compartment 22 are shown. The radial extremity of the vane compartments 22 are closed by a wall 24 extending from the inlet to the outlet of mixing element 13*a*. The material fed from space 5 expands to fill the vane compartments 22. Vane compartments 23 are closed at the inlet end by a wall (not shown) and are open at their radial extremities. The material fed from space 4a is distributed by the action of the sloping wall 25 of the outflow nozzle 3 into vane compartments 23, filling the same. The remaining mixing elements 13*b* to 13*d* operate in a similar manner as is well known in the art.

The extruder works as follows:

The stationary outer jacket 1 which is heatable and coolable has a charging hopper 2 at the rear end, which is divided by a partition 2*a* into two chambers, one 18 feeding into conveyer space 4*a* and the other 19 feeding into conveyer space 5, and a nozzle 3 on the head of the outer jacket 1. Within the outer jacket 1 rotates the outer screw 4, which is set in rotation over an outer drive shaft 15. The screw 4 is provided with screw threads 16, with an axial inner cylindrical space 5 and with window-type openings 6. The space 5 is in communication through the openings 6 with chamber 19 of charging hopper 2. In the space 5 is also arranged the screw 7 with oppositely directed threads 17. The screw 7 does not rotate, but is frictionally connected over the supporting grate 8 which is clamped between the nozzle 3 and the outer jacket 1. The supporting grate 8 is provided with inlet and outlet pipes 10*a* in connection with the bores 10 within screw 7 and an inlet pipe 11*a* in connection with bore 11. The product can flow over the charging hopper 2, on the one hand, to the male thread 16 of the rotating screw 4 and, on the other hand, over the openings 6 into the space 5, and thus to the screw 7. Due to the rotation of the screw 4, there is a double conveying and compressing process of the product; on the one hand, over the male threads 16 of the moving screw 4 regarding the fixed inner wall of the jacket 1, and on the other hand, over the rotating inner surface of the screw 44 relative to the stationary screw 7 and the threads 17.

Through the inlet pipe 10*a*, a coolant is introduced through bores 10 into the inner screw 7 and frictional heat, if any, is eliminated. If necessary, a heat supplying medium can be conducted through the bores 10, depending on the product to be processed.

Through the inlet pipe 11*a* a liquid dye can be introduced through bore or bore 11 provided in the inner screw 7 into the inner material current. The bores 11 open into the space between the threads 17 of the inner screw 7, substantially in the central region of the screw 7.

Beyond the openings in the supporting grid 8, the separate mass streams are brought into the desired cross-sectional arrangement of multicolored parallel strands by the stationary mixing elements 13*a* to 13*d* as described above. The guide channels of the mixing elements 13*a* to 13*d* extend to just before the exit cross-section of outlet cone 3. The compacted extrusion is subsequently divided into blanks which are then stamped into cakes of soap.

The preceding specific embodiment is illustrative of the practice of the invention. It is to be understood, however, that other expedients known to those skilled in the art or disclosed herein may be employed without departing from the spirit of the invention or the scope of the appended claims.

We claim:

1. A process for the production of two-color striped pieces of soap comprising the steps of continuously extruding two strands of colored soap from a single extruder having an inner and an outer extrusion path, the outer strand encompassing the inner strand and each strand having a different color, said extrusion being at an equal rate for each strand, passing said two strands of colored soap through separate die orifices within a radial cross-section whereby said two strands of colored soap are combined in a predetermined cross-section with said inner strand having a cross-section other than circular, and compressing said combined strand, cutting said compressed combined strand and recovering two-colored striped pieces of soap.

2. A single extruder provided with a hopper at one end and a restricted nozzle at the opposite end and two press-screws arranged coaxially in one another within an outer jacket, each of said screws being provided with a male thread for feeding in the direction of said nozzle, said male threads extending into an outer annular space between said jacket and the outer press-screw and extending into an inner annular space between said two press-screws, said threads being oppositely oriented, means to rotate the outer of said two press-screws and means to maintain the inner of said two press-screws stationary, said outer press-screw being provided with window-like openings communicating with said inner press-screw in the area of said hopper and separate feed means in said hopper to separately feed to the area between said outer jacket and said outer press-screw and to the area between said outer press-screw and said inner press-screw through said window-like openings, whereby said material being conveyed by said outer press-screw and said material being conveyed by said inner press-screw are substantially equal and conveyed at substantially the same rate by rotation of the outer press-screw, the improvement consisting in that said restricted nozzle is provided with two channels having a predetermined outlet cross-section with the outer channel at the inlet completely encompassing the inner channel, said outer channel at the inlet being fed from said outer press-screw and said inner channel at the inlet being fed from said inner screw, the outlet cross-section of said inner channel being other than circular, whereby the outer edge of said inner channel cross-section at the outlet is coextensive with the other channel cross-section.

3. The single extruder of claim 2 having means in association with said stationary inner press-screw to pass a dye into said material being conveyed by said inner press-screw.

* * * * *